United States Patent
Fan et al.

(10) Patent No.: US 7,630,212 B2
(45) Date of Patent: Dec. 8, 2009

(54) HANDLE FOR A RISER CARD ASSEMBLY

(75) Inventors: Chen-Lu Fan, Tu-Cheng (TW); Li-Ping Chen, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 453 days.

(21) Appl. No.: 11/309,643

(22) Filed: Sep. 1, 2006

(65) Prior Publication Data

US 2008/0055876 A1    Mar. 6, 2008

(51) Int. Cl.
*H05K 7/10*    (2006.01)

(52) U.S. Cl. .................. 361/798; 361/754; 361/801; 439/327

(58) Field of Classification Search ............. 361/801, 361/798, 754, 756, 741; 439/327
See application file for complete search history.

(56) References Cited

U.S. PATENT DOCUMENTS

| | | | | |
|---|---|---|---|---|
| 5,020,151 | A * | 5/1991 | Sampei et al. ............. 455/345 |
| 5,162,979 | A * | 11/1992 | Anzelone et al. ....... 361/679.32 |
| 5,216,904 | A * | 6/1993 | Isaki ............................ 70/58 |
| 5,530,620 | A * | 6/1996 | Sangveraphunsiri ... 361/679.33 |
| 5,943,218 | A * | 8/1999 | Liu ............................ 361/801 |
| 6,007,357 | A * | 12/1999 | Perino et al. ................. 439/327 |
| 6,056,579 | A * | 5/2000 | Richards et al. ............. 439/358 |
| 6,236,573 | B1 * | 5/2001 | Gundlach et al. ........... 361/801 |
| 6,282,097 | B1 * | 8/2001 | Minelli et al. ............... 361/728 |
| 6,319,037 | B1 * | 11/2001 | Lai ............................ 439/327 |
| 6,370,036 | B1 * | 4/2002 | Boe ............................ 361/801 |
| 6,396,703 | B1 | 5/2002 | White |
| 6,517,369 | B1 * | 2/2003 | Butterbaugh et al. ........ 439/327 |
| 6,529,386 | B2 * | 3/2003 | Boe ............................ 361/801 |

\* cited by examiner

*Primary Examiner*—Dameon E Levi
(74) *Attorney, Agent, or Firm*—Wei Te Chung

(57) ABSTRACT

A riser card assembly includes a bracket with a riser card secured therein, a handle, and a sliding mechanism. At least one expansion card is connected with the riser card and received in the bracket. The sliding mechanism slidably secures the handle to the bracket. The sliding mechanism includes at least one guiding pin formed on one of the handle and the bracket, and at least one slot receiving the guiding pin sliding therein defined in the other of the handle and the bracket. The at least one guiding pin slides in the at least one slot between a first position where the handle is in a retracted state to be together with the bracket, and a second position where the handle is in an extended state to be away from the bracket.

15 Claims, 4 Drawing Sheets

HANDLE FOR A RISER CARD ASSEMBLY

DESCRIPTION

1. Field of the Invention

The present invention relates to handle mechanisms, and more particularly to a handle for disengaging a riser card assembly from a backplane board.

2. Description of Related Art

With the development of computer technology, computer systems become more and more extensible, and different functions may be enhanced by adding different peripheral components, most of which are mounted on the backplane board. However, the scale of the backplane board is limited, there is not enough space to add all of the desired components thereon.

As a result, riser cards are provided for connecting several peripheral components to the backplane board without occupying too much space. The riser card includes an edge connector connected to a slot of the backplane board and several slots connected to different peripheral components. While the riser card is firmly mounted on the backplane board, high extraction forces are often required to release the edge connector of the riser card from the slot of the backplane board. Furthermore, the riser cards are often closely spaced together such that it is difficult to grip an individual riser card to pull it out of the slot.

Various solutions to the above problems have been proposed. In one method, an ejection mechanism is provided for disengaging a riser card from a backplane board of a computer system. The mechanism includes an elongate lever having an upper manipulation region, a lower abutting region, and a pivot point located between the upper and lower regions. The elongate lever is mounted on a riser card at the pivot and generally extends downward a sufficient distance as to contact the backplane board upon rotation of the lever, and extends upward a sufficient distance to create sufficient leverage for disengaging the riser card. However, the elongate lever may strike the backplane board, and cause damage.

It is therefore desirable to find a mechanism to disengage the riser card and avoid damaging the backplane board.

SUMMARY OF THE INVENTION

A riser card assembly includes a bracket with a riser card secured therein, a handle, and a sliding mechanism. At least one expansion card is connected with the riser card and received in the bracket. The sliding mechanism slidably secures the handle to the bracket. The sliding mechanism includes at least one guiding pin formed on one of the handle and the bracket, and at least one slot receiving the guiding pin sliding therein defined in the other of the handle and the bracket. The at least one guiding pin slides in the at least one slot between a first position where the handle is in a retracted state to be together with the bracket, and a second position where the handle is in an extended state to be away from the bracket.

Other advantages and novel features will be drawn from the following detailed description of preferred embodiments with attached drawings, in which:

DETAILED DESCRIPTION OF THE INVENTION

Figure 1:
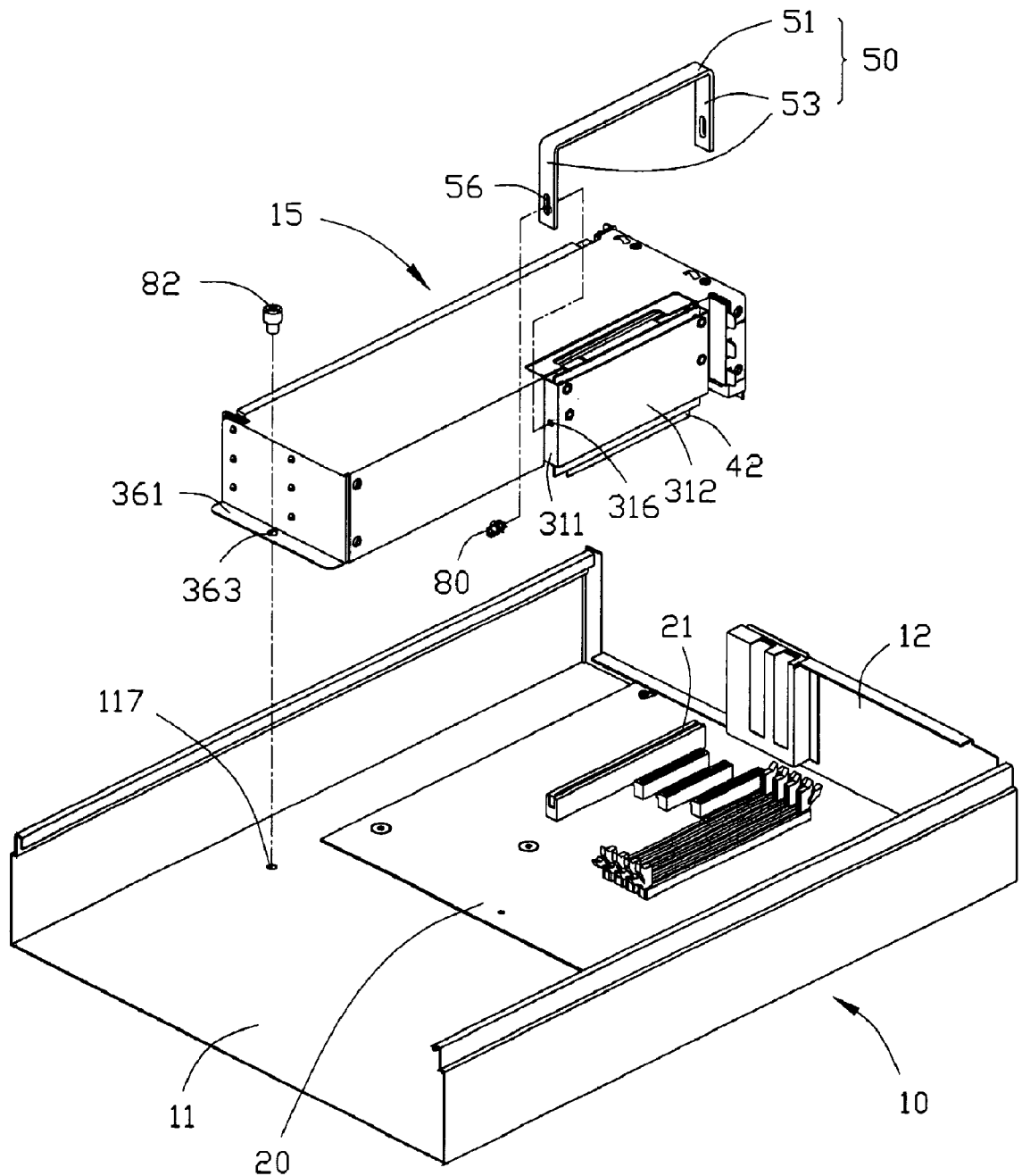
FIG. 1 is an exploded isometric view of a riser card assembly in accordance with a preferred embodiment of the present invention with a handle, aligned for mounting to a motherboard, which is secured in a chassis.
Figure 2:
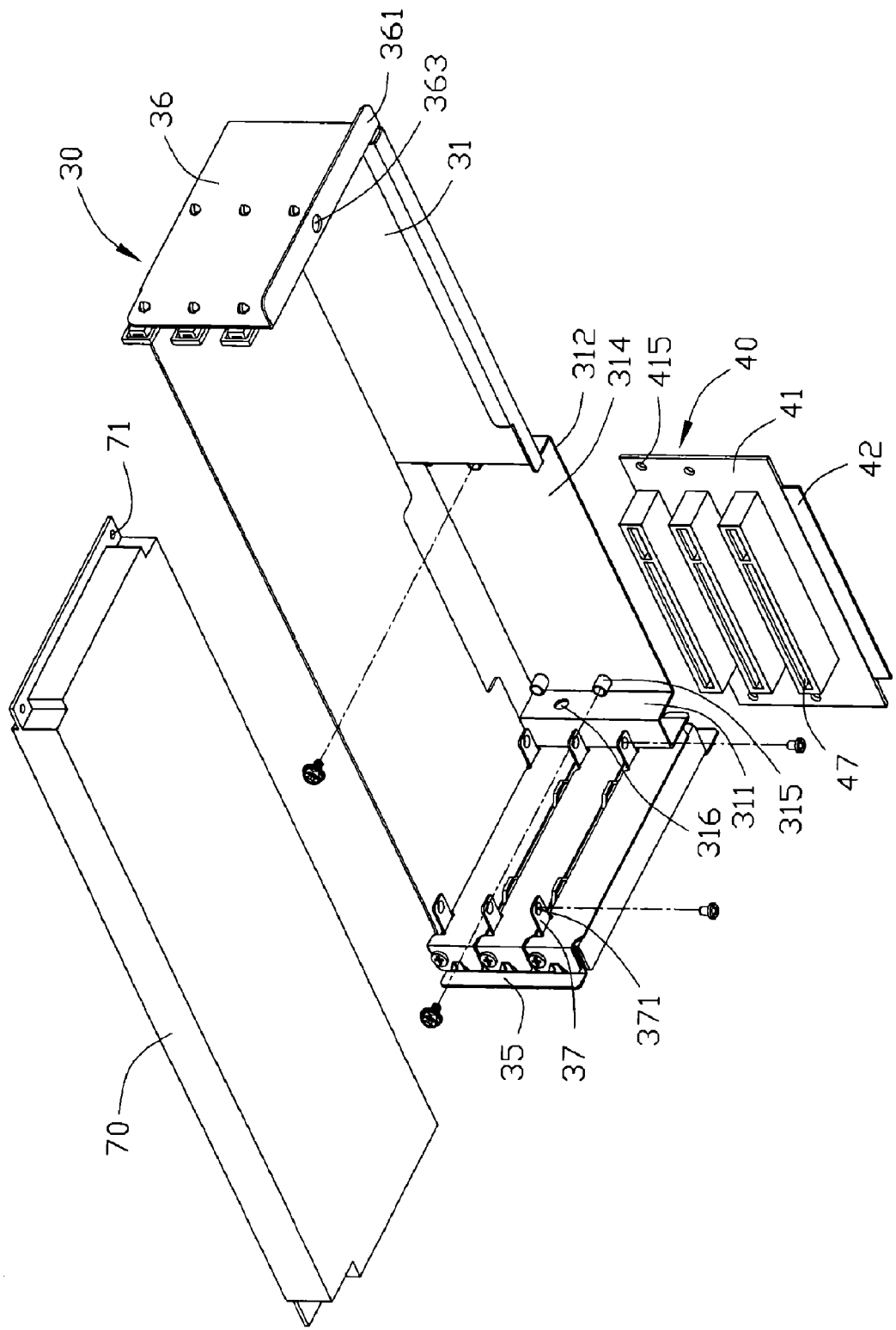
FIG. 2 is an exploded isometric view of the riser card assembly of FIG. 1 viewed in another aspect.

Referring to FIGS. 1 and 2, a handle 50 of a riser card assembly 15 in accordance with a preferred embodiment of the present invention is used to disengage the riser card assembly 15 from a motherboard 20 which is received in a chassis 10.

The chassis 10 includes a bottom plate 11. One edge of the bottom plate 111 extends upwardly and perpendicularly to form a side plate 12. The motherboard 20 is secured on the bottom plate 11. A screw hole 117 is defined in the bottom plate 11 near the motherboard 20. The motherboard 20 defines a plurality of expansion slots 21 for connecting different components.

The riser card assembly 15 includes a bracket 30, a riser card 40, and an expansion card 70. The expansion card 70 defines a plurality of holes 71 in two edges thereof.

The bracket 30 includes a rear board 31. One portion of the rear board 31 is stamped outwardly to form two lateral plates 311 and a securing plate 312 connecting the two lateral plates 311. The securing plate 312 and the lateral plates 311 together define a recess 314 therebetween. A positioning aperture 316 is defined in each lateral plate 311. A plurality of hollow securing posts 315 is formed inward on the securing plate 312.

A plate 35 is secured on one edge of the rear board 31 adjacent the recess 314. A side board 36 extends perpendicularly from the opposite edge of the rear board 31. The plate 35 and the side board 36 respectively form a plurality of support tabs 37 extending in toward each other. Each support tab 37 defines an aperture 371. A flange 361 is formed from a bottom of the side board 36. A retaining hole 363 is defined in the flange 361 corresponding to the screw hole 117 of the chassis 10. A bottom of the flange 361 is lower than a bottom of the rear board 31.

The riser card 40 includes a circuit board 41 with an edge connector 42 adapted for inserting into one of the expansion slots 21. Several expansion slots 47 are formed on the circuit board 41, and adapted for connecting the expansion card 70. The circuit board 41 includes a plurality of securing holes 415 corresponding to the securing posts 315 of the securing plate 312.

The handle 50 is generally a U-shaped piece. The handle 50 includes an operating portion 51, and two legs 53 extending from opposites ends of the operating portion 51. Each one of the legs 53 defines a sliding slot 56 corresponding to the positioning aperture 316 of the lateral plate 311. A distance between the two legs 53 is generally equal to a distance between the two lateral plates 311.

In assembly of the riser card assembly 15, the riser card 40 is mounted on the securing plate 312 of the bracket 30 via screws passing through the securing holes 415 and screwing into the corresponding securing posts 315. The expansion card 70 inserts into one of the expansion slots 47 with two lateral edges supported on the tabs 37 of the plate 35 and the side board 36. The holes 71 of the expansion card 70 are aligned with the apertures 371 of the tabs 37 to secure the expansion card 70 on the bracket 30 via screws.

Then, the handle 50 moves close to the bracket 30 with the two legs 53 sliding along the two lateral plates 311 respectively until the sliding slots 56 of the legs 53 are aligned with the positioning apertures 316 of the lateral pieces 311. A guiding pin 80 extends through a sliding slot 56 of one of the two legs 53, and is secured in the corresponding positioning aperture 316 of the corresponding lateral piece 311. Another guiding pin 80 extends through a sliding slot 56 of the other of the two legs 53, and is secured in the corresponding positioning aperture 316 of the corresponding lateral piece 311. With the two guiding pins 80 received in the two sliding slots 56, the handle 50 is slidable up and down on the bracket 30. The handle 50 is held in a lowest position with the operating portion 51 of the handle 50 resisting against the bracket 30 by gravity.

In assembly of the riser card assembly 15 with the handle 50 to the chassis 10, the edge connector 42 of the riser card 40 is firmly inserted into one of the plurality of expansion slots 21 of the motherboard 20. Simultaneously, the flange 361 of the bracket 30 is placed on the bottom plate 11 of the chassis 10 with the retaining hole 363 aligned with the screw hole 117. A screw 82 extends through the retaining hole 363 and screws into the screw hole 117 to secure the riser card assembly 15 with the chassis 10.

Figure 3:
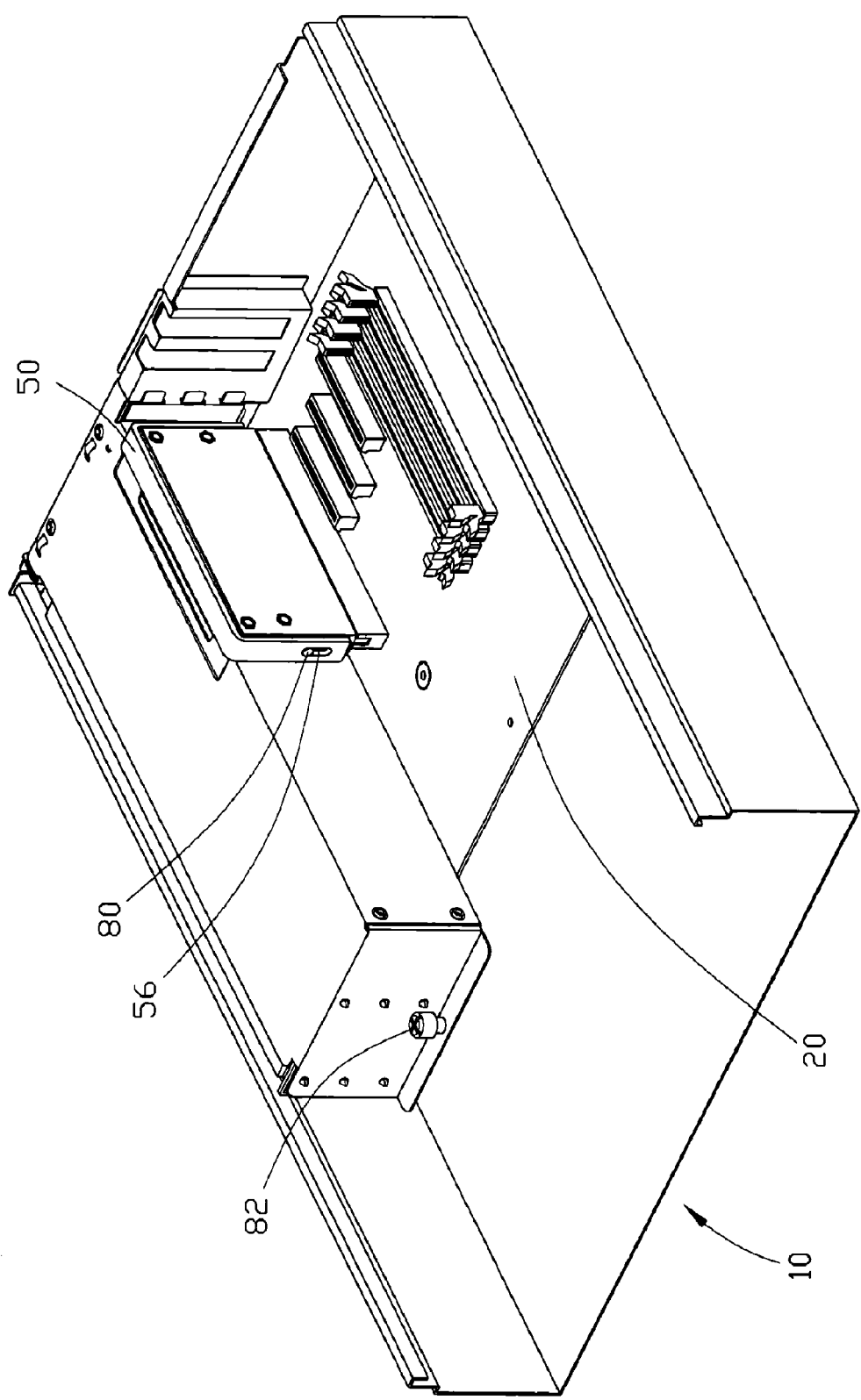
FIG. 3 is an isometric view of the riser card assembly of FIG. 1 mounted to the motherboard of FIG. 1.
Figure 4:
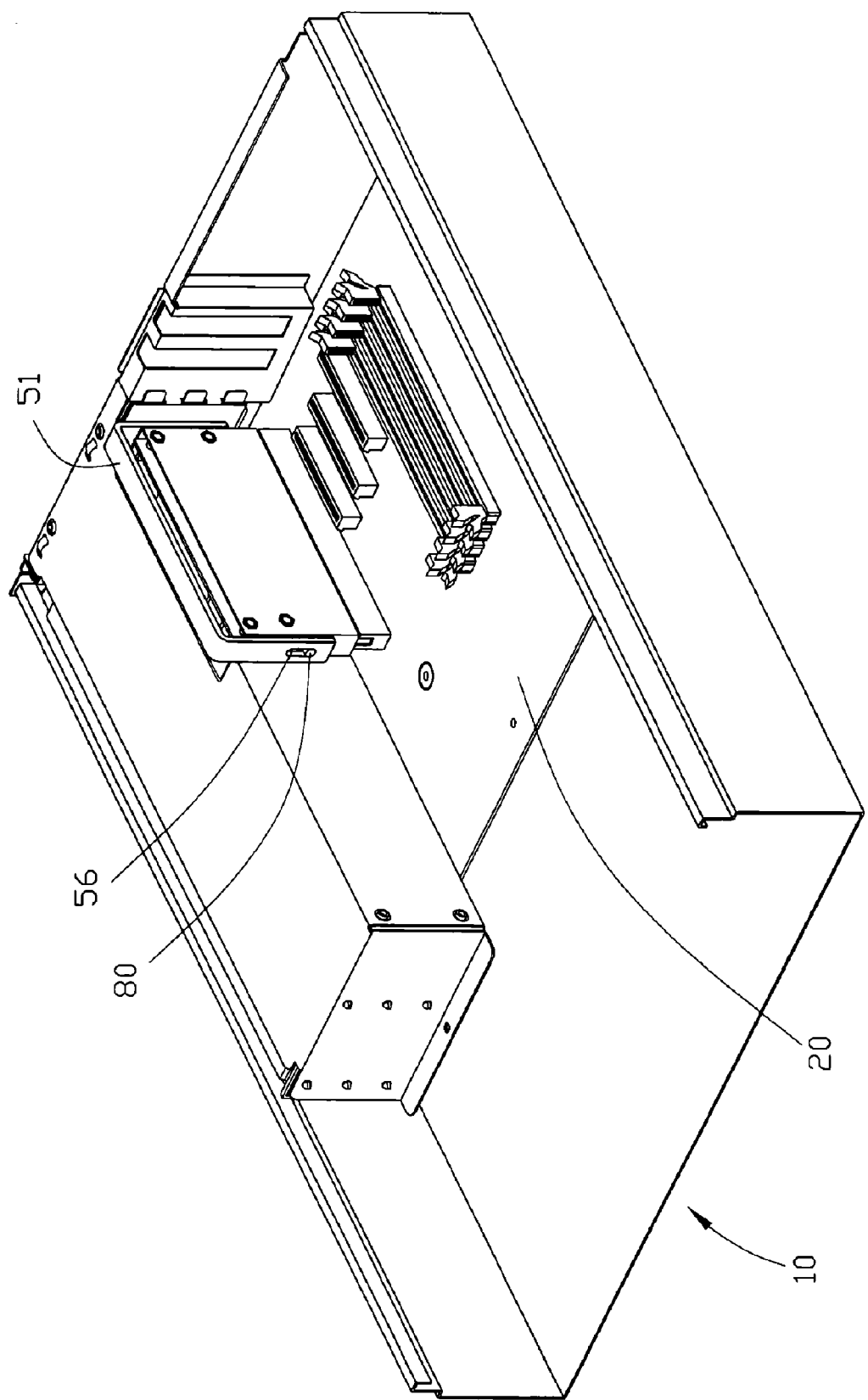
FIG. 4 is an isometric view of the riser card assembly of FIG. 1 prepared for disengagement from the motherboard of FIG. 1.

Referring to FIGS. 3 and 4, in disassembly of the riser card assembly 15 from the chassis 10, the screw 82 is unscrewed from the screw hole 117 of the chassis 10. The handle 50 is lifted up until the guiding pins 80 resist against bottoms of the sliding slots 56 of the handle 50 thus stopping further upward movement of the handle 50, so there is a space between the operating portion 51 of the handle 50 and the bracket 30 for conveniently grasping the handle 50. An upward force is exerted on the operating portion 51 of the handle 50 to disengage the riser card assembly 15 from the motherboard 20.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A riser card assembly, comprising:
a bracket with an interior and an exterior;
a riser card secured in the interior of the bracket, at least one expansion card connected with the riser card and received in the bracket; a handle slidably mounted on the exterior of the bracket adapted for conveniently pulling the bracket; and a sliding mechanism slidably securing the handle to the bracket, the sliding mechanism comprising at least one guiding pin secured on one of the handle and the bracket, and at least one slot receiving the guiding pin sliding therein defined in the other of the handle and the bracket, the at least one guiding pin being slidable in the at least one slot between a first position where the handle is in a retracted state to be together with the bracket, and a second position where the handle is in an extended state to be away from the bracket, wherein the bracket comprises a rear board, one portion of the rear board is stamped outwardly to define a recess for receiving the riser card, the recess is surround by a securing plate and a pair of lateral plates on opposite sides of the securing plate, and, wherein the at least one guiding pin is secured on either one of the pair of lateral plates, the handle comprises a pair of legs corresponding to the pair of lateral plates, and the at least one sliding slot is defined on either one of the pair of legs correspondingly receiving the at least one guiding pin sliding therein.

2. The riser card assembly as described in claim 1, wherein a distance between the two legs is generally equal to a distance between the two lateral plates.

3. The riser card assembly as described in claim 1, wherein the handle comprises an operating portion connecting the pair of legs for convenient operation thereof, the operating portion abutting on the bracket at the first position and being away from the bracket at the second position.

4. The riser card assembly as described in claim 1, wherein a plate is secured on one edge of the rear board adjacent the recess, a side board extends perpendicularly from the opposite edge of the rear board, the plate and the side board respectively form a plurality of support tabs extending in toward each other for supporting the expansion card.

5. The riser card assembly as described in claim 4, wherein each support tab defines an aperture therein, the expansion card defines a plurality of holes in two edges thereof aligned with the apertures of the tabs for securing the expansion card on the bracket.

6. The riser card assembly as described in claim 4, wherein the side board forms a flange at a bottom thereof adapted for abutting on a board for supporting the riser card assembly on the board.

7. The riser card assembly as described in claim 6, wherein a retaining hole is defined in the flange, and a screw hole is defined in the board and aligned with the retaining hole for securing the riser card assembly on the board.

8. A combination, comprising:
a chassis with a motherboard secured therein, a screw hole defined in the chassis adjacent the motherboard, the motherboard comprising at least one expansion slot; and
a riser card assembly comprising a bracket, the bracket defining a retaining hole corresponding to the screw hole, a riser card coupled with an expansion card mounted in the bracket, the riser card comprising an edge connector configured for connecting with the at least one expansion slot, a handle mounted on the bracket; wherein the edge connector of the riser card is inserted into the at least one expansion slot of the motherboard, the retaining hole is aligned with the screw hole to have a screw fastened in the retaining hole and the screw hole to secure the riser card assembly with the chassis, and in disassembly, the screw is unscrewed from the retaining hole and the screw hole, the handle is pulled upwardly to disengage the riser card assembly from the motherboard,
wherein the bracket defines a recess surround by a securing plate and a pair of lateral plates on opposite sides of the securing plate, the riser card is secured on an inner side of the securing plate, the handle is mounted on exterior sides of the lateral plates, and
wherein a guiding pin is secured on each one of the pair of lateral plates, the handle comprises a pair of legs, and each one of the legs defines a sliding slot for receiving the corresponding guiding pin sliding therein to have the handle moving from a retracted position to an extended position.

9. The combination as described in claim 8, wherein the bracket forms a flange at a bottom thereof configured for abutting on the chassis, and the retaining hole is defined in the flange.

10. The combination as described in claim 8, further comprising a sliding mechanism for slidably securing the handle to the bracket.

11. The combination as described in claim 10, wherein the sliding mechanism comprises at least one guiding pin secured on one of the handle and the bracket, and at least one slot receiving the at least one guiding pin sliding therein formed on the other of the handle and the bracket.

12. The combination as described in claim 8, wherein the handle comprises an operating portion connecting the pair of legs for convenient operation thereof.

13. An assembly comprising:
a chassis comprising a plate on which a motherboard is mounted, at least one expansion slot being defined on the motherboard;
a bracket attached within the chassis, a protrusion portion protruding outwardly from the bracket to form a corresponding recess at an interior of the bracket;
a riser card mounted to the bracket and received in the recess, the riser card comprising an edge connector electrically coupling with the at least one expansion slot; an expansion card electrically coupling with the riser card and parallel with the motherboard; a handle slidably attached to the protrusion portion and being slidable with respect to the protrusion portion between a retracted position and an extended position,
wherein the handle is U-shaped and rides over the protrusion portion, the handle comprising an operating portion and a pair of legs extending from opposite ends of the operating portion, the operating portion abutting on the protrusion portion at the retracted position and being away from the bracket at the extended position for convenient operation.

14. The assembly as claimed in claim 13, wherein an elongated slot is defined at one of the handle and protrusion portion, a securing hole is defined at the other one of the handle and the protrusion portion, and a pin extends through the elongated slot and engages with the securing hole to thereby slidably attached the handle to the protrusion portion.

15. The assembly as claimed in claim 13, wherein the bracket is detachably secured to the plate via a screw.

* * * * *

UNITED STATES PATENT AND TRADEMARK OFFICE
CERTIFICATE OF CORRECTION

PATENT NO. : 7,630,212 B2　　　　　　　　　　　　　　　　　　　　　　　　　Page 1 of 1
APPLICATION NO. : 11/309643
DATED : December 8, 2009
INVENTOR(S) : Fan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 551 days.

Signed and Sealed this

Second Day of November, 2010

David J. Kappos
*Director of the United States Patent and Trademark Office*